Oct. 3, 1961 W. H. TROW 3,002,438
CAMERA
Filed March 9, 1959 2 Sheets-Sheet 1

INVENTOR
William H. Trow
BY Strauch, Nolan & Neale
ATTORNEYS

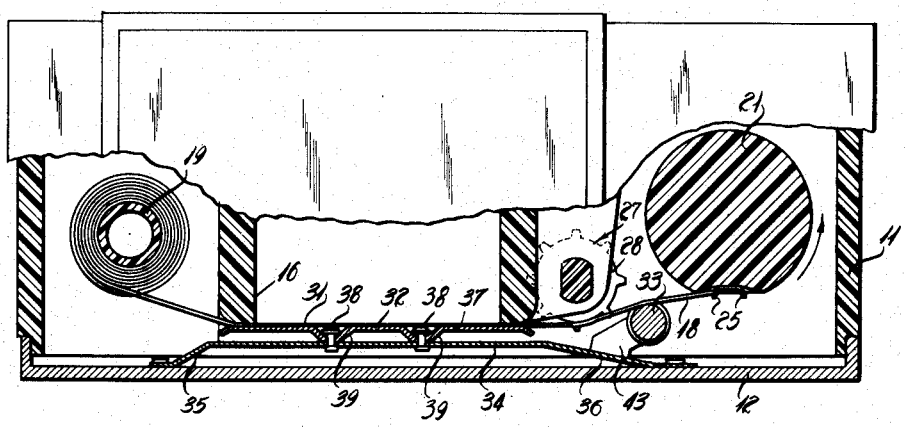

United States Patent Office 3,002,438
Patented Oct. 3, 1961

3,002,438
CAMERA
William H. Trow, Ann Arbor, Mich., assignor to Sylvania Electric Products Inc., a corporation of Delaware
Filed Mar. 9, 1959, Ser. No. 797,948
10 Claims. (Cl. 95—31)

This invention relates to cameras and particularly to special cover mounted film pressing and guiding arrangements.

In its preferred embodiment the invention will be disclosed as comprising a film presser plate and a film guide member such as a roller both carried by a resilient mount on a pivoted or other openable camera back.

It is the major object of the invention to provide a novel camera construction wherein a film presser plate adapted to back the film as it is disposed across the exposure aperture and an associated film guide member such as a roller are resiliently mounted upon an openable camera back.

A further object of the invention is to provide a novel camera structure wherein an openable back has mounted thereon a resilient support carrying a film engaging presser plate and an associated rotatable film guide roller.

It is another object of the invention to provide a novel camera structure wherein a film presser plate and a film guide roller are carried by a common flexible support that is detachably mounted on the openable camera back.

It is a further object of the invention to provide a novel subassembly for a camera comprising a sheet metal spring support having fixed thereto a film presser plate and having a film guide roller rotatably mounted adjacent the presser plate.

Further objects of the invention will appear as the description proceeds in connection with the appended claims and the annexed drawings wherein:

FIGURE 3 is a section substantially on line 3—3 of FIGURE 1 showing the coaction of the film guide roller and sprocket;

FIGURE 4 is a top view of the presser pad and film guide roller subassembly;

FIGURE 5 is an end elevation of the subassembly of FIGURE 4;

FIGURE 6 is an enlarged view of the film end anchor on the take-up spool; and

FIGURE 7 is a fragmentary end view of the roller mounting.

Figure 1:
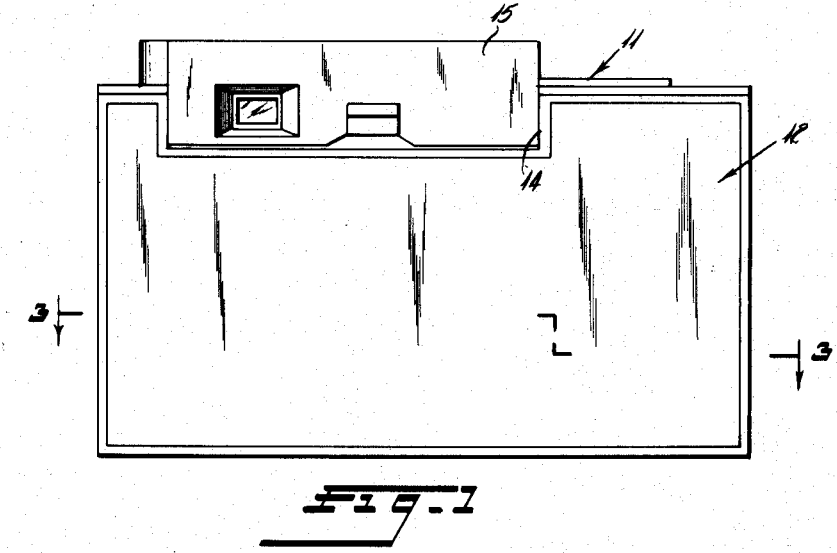
FIGURE 1 is a rear elevation of a camera embodying the invention with the rear cover closed.
Figure 2:
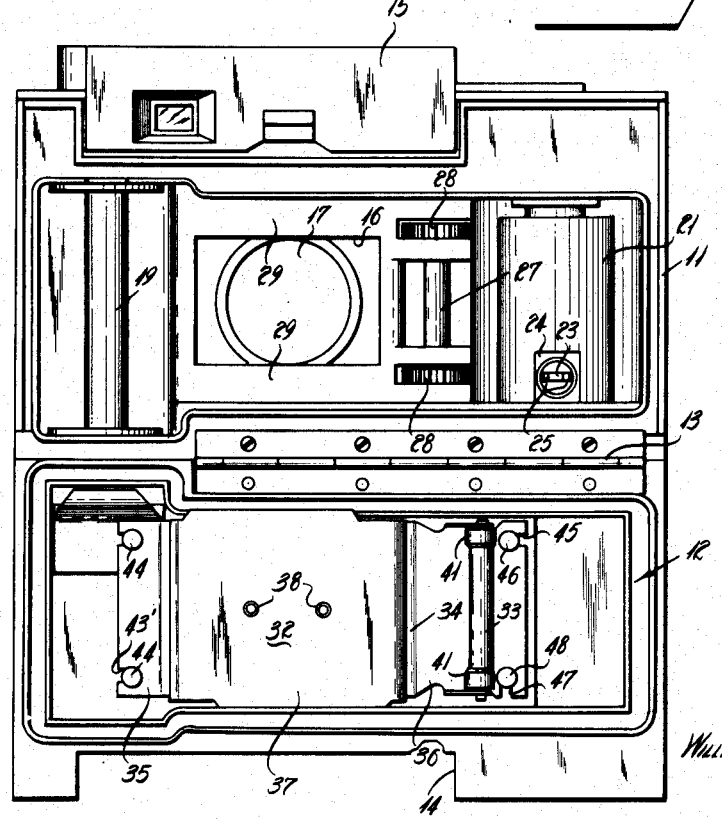
FIGURE 2 is a rear view of the camera of FIGURE 1 with the rear cover open to show the pressure pad mount.

The camera body 11 has a rear cover 12 hinged to the body along one edge at 13. As shown in FIGURES 1 and 2 part of the cover edge is removed at 14 to clear the rangefinder assembly 15 on the body.

With reference to FIGURES 2 and 3 the interior of the camera body comprises an exposure aperture 16 which is located rearwardly of the objective lens 17 and across which the film 18 travels from supply spool 19 to take-up spool 21. The take-up spool 21 has a suitable film end anchoring device comprising a metal strip 23 riveted or similarly secured onto a flat sector 24 of the solid plastic spool 21 and having its opposite ends 25 upturned angularly in opposite diverging directions. These ends 25 form teeth that engage in successive sprocket perforations 26 along an edge of the film, and when the spool 21 is rotated counterclockwise, as by manual rotation of a suitable external knob (not shown), the film advances to the right in FIGURE 3.

The film 18, between the exposure aperture and the spool 21, passes over a sprocket 27 having toothed wheels 28 meshed with perforations 26. Sprocket 27 is freely journalled on the body about an axis parallel to the film travel over the exposure aperture and is usually connected by means (not shown) to drive the exposure counter and control the double exposure prevention mechanism.

In passing over aperture 16 the film is supported and guided along opposite edges by film track surfaces 29 which are in longitudinal alignment with sprocket wheels 28. The film track surfaces define a plane indicated at 31 in a region where a flat section of film 18 moves across and at right angles to the optical axis of the objective before passing onto the sprocket. The film perforations mesh with the toothed sprocket wheels and thereby rotate the sprocket counterclockwise. Since the sprocket holes are exceedingly accurately sized and located, this provides a positive drive for the sprocket to rotate it the same angular amount for each length of film passing over it.

Mounted on the inside of the camera back cover are a pressure pad 32 and a film guide roller 33. The pad and roller are both mounted on a resilient support in the form of a sheet metal plate 34 having at opposite ends angularly bent integral spring arms 35 and 36.

Pad 32 is preferably a sheet of metal having a smooth front surface 37 that contacts the rear surface of the film, and pad 32 is fixed as by rivets 38 to plate 34 and maintained in spaced parallel relation thereto by lugs 39 which are preferably portions of the pad struck out when the rivet holes are formed. Thus pad 32 is mounted to extend parallel to plane 31 and is resiliently biased toward plane 31 by spring arms 35 and 36 which are normally of sufficient force to cause the pad to press the film lightly against track surfaces 29 along the sprocket perforation regions. This maintains the film flat and taut across the exposure aperture.

The roller 33 has slightly enlarged cylindrical end sections 41 that are longitudinally aligned with the sprocket wheels 28 when the back is closed, and end arbors 42 of the sprocket are journalled freedly in parallel ears 43 that comprise upstanding integral projections of spring arm 36, as shown in FIGURE 7.

Spring arm 35 is formed at its outer end with longitudinally open notches 43' adapted to slide under the heads of rivets 44 fixed upon the camera back 12.

Spring arm 36 is formed with one longitudinally open end notch 45 adapted to slide under the head of rivet 46 fixed to the camera back, and with a laterally open notch 47 adapted to slide under the head of rivet 48 fixed to the camera back.

Usually the pressure pad 32 and roller 33 are mounted on the plate 34 to provide a special subassembly that is then mounted on the camera back. This is usually done by first inserting notches 47 under rivet 48, rocking the subassembly to insert notch 45 under rivet 46, then compressing the spring arms to insert notches 43' under rivets 44, and then allowing the spring arms to expand in position. The rivets are so longitudinally spaced that pad 32 exerts slight pressure on the film.

The subassembly is easily demounted from the camera back by detaching the notches from under the rivets.

Referring to FIGURE 3 it will be observed that the axis of roller 33, while parallel to the plane 31, is disposed to engage the film between the sprocket and the take-up spool and to guide the film slightly forwardly from that plane toward the toothed sprocket wheels 28. This insures that when the camera back is closed the film, which is already threaded from spool to spool, is positively drive coupled to the sprocket.

Since roller 33 is mounted on spring arm 36 it will be seen that roller 33 engages the film with a light resilient pressure. This is of considerable advantage in that precise tolerances are not required for locating roller 33 relative to the sprocket and film path, and also the resilient action of arm 36 keeps the film taut at all times. Also this prevents the film of its own resiliency from backing off the take-up spool toward the exposure aperture after a frame advance has been completed, so that accuracy of registration is aided.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a camera having a rearwardly open body and an openable back cover, supply and take-up spool mounting means within the body at opposite ends of means defining an exposure aperture, a rotatable sprocket within the body disposed longitudinally between the exposure aperture and the take-up spool mounting means, a rotatable film guide roller on the back cover adapted when the cover is closed to engage the film between the sprocket and the take-up spool, a film presser plate on the back cover adapted when the cover is closed to back the film at the exposure aperture, and means resiliently mounting the presser plate and guide roller on said back cover.

2. In a camera having a body provided with an exposure aperture having a rearwardly facing film guide track, a rotatable take-up spool within the body, a rotatable sprocket on said body parallel to the spool and disposed between the spool and the exposure aperture, an openable camera back, a resiliently backed pressure plate on said back, and a resiliently mounted rotatable film guide roller on said back adapted to engage the film between the sprocket and the take-up spool, said pressure plate and said guide roller having the same resilient mounting.

3. In a camera having a body formed with an exposure aperture and a film track surface substantially normal to the exposure axis, an openable back, a sheet metal spring plate mounted on the inner face of said camera back, a film presser plate mounted on said spring plate and adapted to back a film disposed on said surface, and a film guide member mounted on said spring plate adapted to engage the film adjacent said aperture.

4. In the camera defined in claim 3, said guide member being a roller freely rotatably mounted on said spring plate.

5. In a camera defined in claim 3, means detachably mounting said spring plate on said camera back.

6. In the camera defined in claim 3, a rotatable sprocket on said body adjacent said aperture and on an axis parallel to but disposed forwardly with respect to the plane of said surface, and said member when the camera back is closed contacting the film adjacent the sprocket but at the side thereof opposite said aperture and urging said film forwardly of the plane of said surface.

7. A subassembly for a camera comprising a resilient bowed sheet metal plate structure adapted to be mounted on a camera back, a film engaging pressure pad fixed on said structure, and a film guide roller freely rotatably mounted on said structure on an axis parallel to the film engaging front surface of said pressure pad.

8. In the subassembly defined in claim 7, said structure comprising an inclined spring leg, and said guide roller being mounted on said leg.

9. In a camera having an openable back, a support mounted on the inner face of said back comprising a bowed sheet metal spring member having angularly directed spring leg means connected to said back, a film engaging pressure plate fixed on said support, and a film engaging guide roller freely rotatably mounted on one of said leg means.

10. In the camera defined in claim 9, said roller being mounted in upturned integral ears on said one leg means.

References Cited in the file of this patent

UNITED STATES PATENTS

| 2,147,106 | Nuchterlein | Feb. 14, 1939 |
| 2,245,158 | Philips et al. | June 10, 1941 |
| 2,266,426 | Koszalka | Dec. 16, 1941 |
| 2,691,925 | Sewig | Oct. 19, 1954 |

FOREIGN PATENTS

| 481,516 | Germany | Aug. 23, 1929 |